E. A. L. BOURDELLES.
SMALL ARM.
APPLICATION FILED JULY 30, 1917.

1,367,453.

Patented Feb. 1, 1921.
6 SHEETS—SHEET 1.

Inventor.
E. A. L. Bourdelles

E. A. L. BOURDELLES.
SMALL ARM.
APPLICATION FILED JULY 30, 1917.

1,367,453.

Patented Feb. 1, 1921.
6 SHEETS—SHEET 6.

Fig.17

Inventor.
E. A. L. Bourdelles

UNITED STATES PATENT OFFICE.

EMILE ALEXANDRE LOUIS BOURDELLES, OF ST.-DENIS, FRANCE, ASSIGNOR TO SOCIETE ANONYME DES ETABLISSEMENTS DELAUNAY BELLEVILLE, OF ST.-DENIS, FRANCE, A CORPORATION OF FRANCE.

SMALL-ARM.

1,367,453.   Specification of Letters Patent.   Patented Feb. 1, 1921.

Application filed July 30, 1917. Serial No. 183,618.

*To all whom it may concern:*

Be it known that I, EMILE ALEXANDRE LOUIS BOURDELLES, engineer, of 1 Rue de l'Ermitage, at St.-Denis, Department of the Seine, France, citizen of the French Republic, have invented certain new and useful Improvemenets in or Relating to Small-Arms; and I do hereby declare the following to be a full, clear, and exact description of the invention, such as will enable others skilled in the art to which it appertains to make and use the same.

The present invention has for its object improvements made in automatic arms of the kind in which the reloading is automatically effected by means of a mechanism actuated by a piston operated by the force of expansion of the gases in the barrel.

The invention is likewise applicable to non-automatic rifles now in use for the purpose of converting them into automatic rifles.

In this invention and contrary to the weapons already constructed the gases in the barrel, instead of acting directly to open the movable breech, keep it closed until the moment in which a system of springs compressed by the force of the gases and bearing against the movable breech counterbalance the force resulting from the friction of the lugs of the movable head against their supports. The action of the gases is exerted therefore indirectly only on the movable breech. It cannot therefore cause any sudden opening bringing about the breakdown or deterioration of the parts of the weapon and it avoids premature opening or stripping of the cartridge in the case of excess of pressure which nearly always inevitably happens in weapons operated by the aid of gas and direct action. The expansion of the springs produces, furthermore, the extraction of the empty cartridge case, introduction of a cartridge into the barrel and the cocking of the hammer which produces the firing of the shot.

I will describe with reference to the accompanying drawings a construction in accordance with the present invention but I do not limit myself to the precise construction described and illustrated.

Figures 1, 2, 3, 4:
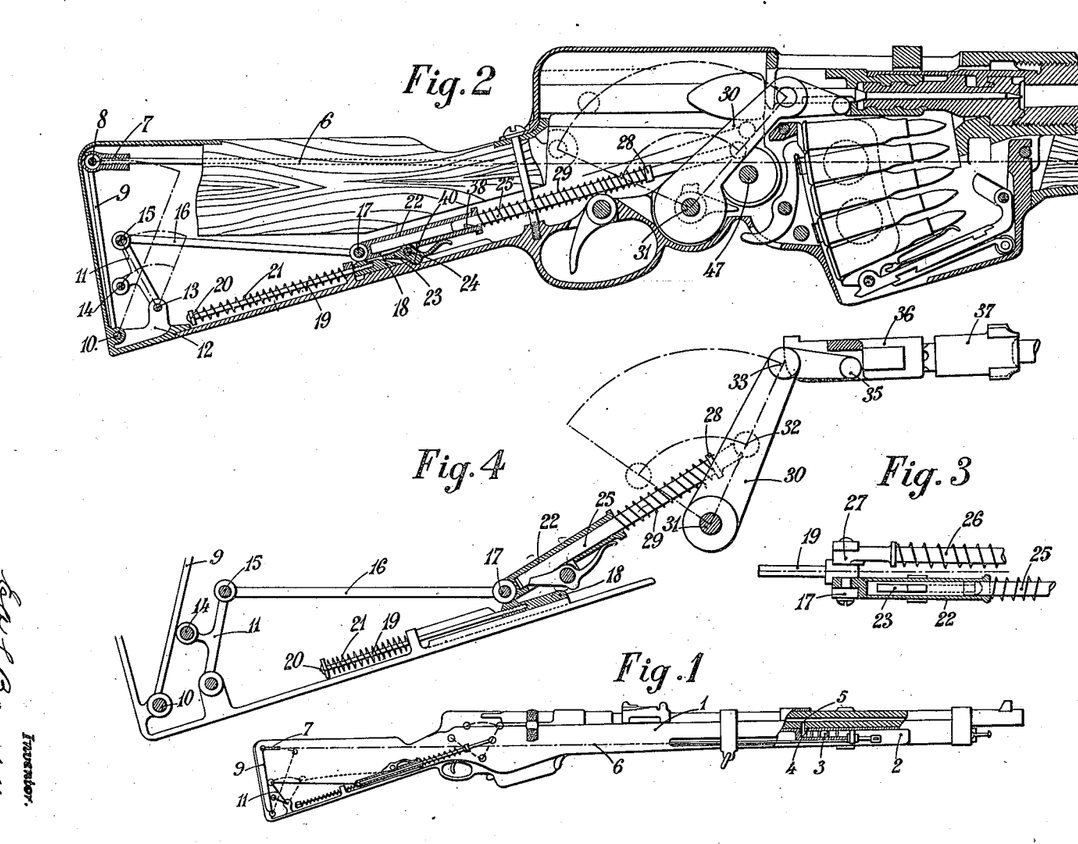
Figure 1 is an elevation partly in section of an automatic rifle in accordance with the present invention.
Fig. 2 is a vertical section of the rear portion of the rifle, showing the details of the mechanism of the springs.
Fig. 3 is a plan view showing the articulation of the systems controlling the movable breech and the firing mechanism respectively.
Figs. 4 and 5 are respectively views drawn to an enlarged scale of the mechanism for operating the movable breech, both figures being shown partly in section.

Referring to Fig. 1 of the drawings: 1 indicates the rifle of which the stock 2 is hollowed to receive a cylinder 4, arranged parallel with the length of the barrel, and in which cylinder a piston 3 works which is rigidly attached to a rod 6 extending longitudinally inside the rifle. The cylinder 4 is in communication with the bore of the barrel of the rifle by a port 5, in such a way that at the moment of firing the pressure of the gases may act upon the piston 3 and drive it back thus actuating the mechanism for operating the movable breech and the firing mechanism which will be hereinafter described. The rod 6 is connected at one end to a socket 7 (see Fig. 2) and by a pivot 8 to a lever 9 connected at 10 to the butt of the rifle. An intermediate lever 11, connected at 13 to a bearing plate 12, has a roller which constantly bears against the lever 9. The end 15 of the intermediate lever 11 is connected to a rod 16, which is connected at 17 to a slide mounted on a guide forming part of the magazine trigger guard. The slide 18 is kept in its normal position by means of a spring 21 acting against a shoulder 20 on a rod 19 permanently connected to the slide. The slide 18 serves as a fulcrum for two telescopic connecting rods one comprising a socket 22 carrying a pawl 23 pivoted at 24 and the function of which is hereinafter fully described. A rod 25 entering the socket 22 actuates the mechanism which operates the movable breech. The other telescopic connecting rod 26, pivoted at 27 to the slide 18, Fig. 3, also actuates the mechanism which operates the firing mechanism. The rod 25 is constantly forced back by a spring 29 which bears at one end against a shoulder 28 on this rod and at the other end against the socket 22. The end of the rod 25 is also pivoted at 32, Figs. 2 and 4, to a lever 30 rockable on a shaft 31 and connected at its free end 33 to a small connecting rod 34 pivoted at 35 to the movable breech 36 operating the movable head 37. The rod 25 is also provided with a notch or recess 38 to receive a catch carried by the pawl 23.

The working of the mechanism which operates the movable breech is as follows:—

Figures 5, 6:
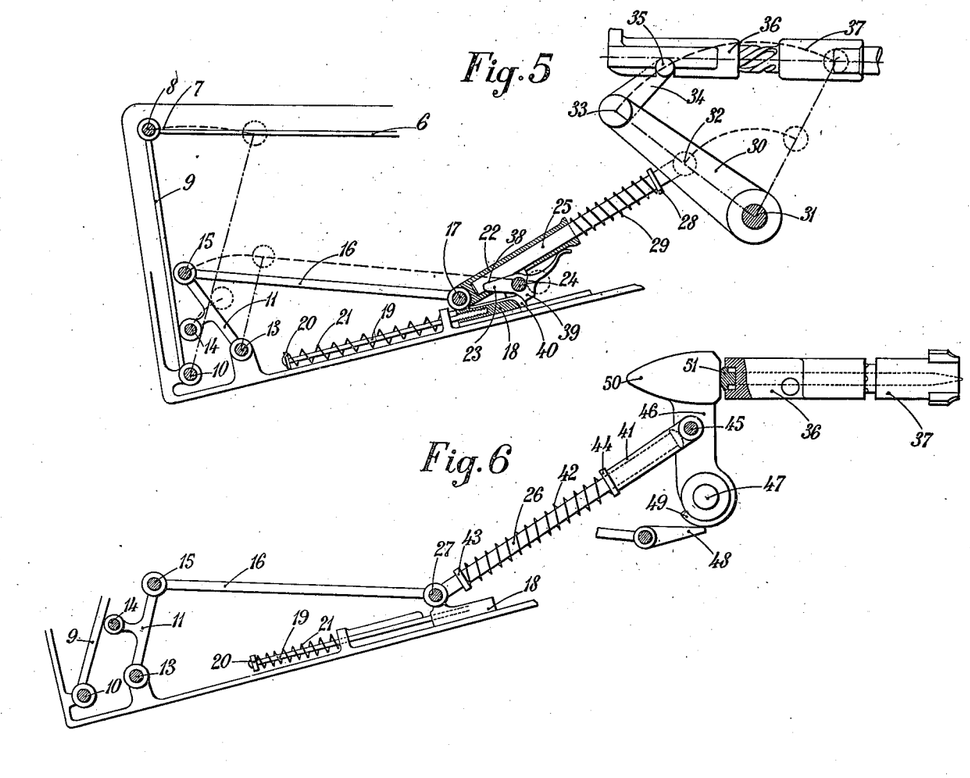
Figs. 6 and 7 are elevations partly in section of the system for operating the firing mechanism, these figures being also drawn to an enlarged scale.

When the shot is fired the piston 3 in consequence of the pressure of the gases of discharge is violently forced toward the right which causes the movement of the lever 9 and by means of the roller 14, the movement of the rod 16 and of the slide 18 against the action of the spring 21 which is thus compressed. The spring 29 is likewise compressed and the catch carried by the pawl 23 is brought opposite the notch or recess 38 in the rod 25 with the result that this rod is forced into the position shown in Fig. 4. As soon as the pressure of the gases on the piston 3 decreases the spring 21 acts to open the movable breech, to effect the withdrawal of the movable head and the ejection of the cartridge case. When the slide 18 is in the position shown in Fig. 5 that is to say when the rearward movement is effected a projection 39 on the pawl 23 strikes against a stop 40 which causes the pawl to tilt the catch out of engagement with the notch or recess 38 in the rod 25 and thus frees this latter. The spring 29 then acts to produce the return of the movable breech, the introduction of a fresh cartridge, and the closing of the movable breech, the slide 18 continues to be brought back by the action of the spring 21 to the position shown in Fig. 2. The mechanism for actuating the firing mechanism works at the same time as the mechanism which operates the movable breech. This mechanism comprises a socket 41 fixed by a pin 45 to the hammer 46 which rocks on a pin 47.

The rod 26 and the socket 41 are connected together by means of a spring 42 which bears against, and is also fixed to a shoulder 43 on the rod 26 and against a shoulder 44 on the socket 41, so as to permit of relative movement between the rod 26 and the socket 41 and to deaden the transmission of movement of the slide for the operation of the hammer. The hammer is provided with a stop 49 into which engages a stop or catch 48 the function of which is to keep the hammer cocked when the slide is at the end of its stroke. The mechanism for operating the firing mechanism works in a similar manner to the mechanism of the movable breech, that is to say when the slide is brought forward at the moment of the discharge of the bullet, owing to the pressure exerted on the piston 3 by the gases, the spring 42 is compressed. As soon as the pressure of the gases diminishes, the slide moves back owing to the action of the spring 21 until the moment in which the spring is completely expanded. During the expansion of spring 21, the slide when it operates to pull back the mechanism of the movable breech by engaging pawl 23, has also pulled connecting rod 26 of socket 41 in the direction of movement of the slide. Concurrently therewith the hammer is retracted by being engaged by the back of the movable breech, the spring 42 being compressed by the time the stop 48 meets the catch 49. At this moment the pawl 23, engaging the stop 40, is released, allowing the compression spring 29 to return the movable breech, but the hammer remains cocked and the rifle ready to be fired. Upon the release of the stop 48, when the piece is fired, the spring 42, which is then under compression, will project the hammer and fire the piece.

The firing mechanism comprises, as usual, a hammer 50 which strikes against the head of the firing pin 51 inclosed in the head of the movable breech. The movable head 37 has a screw and nut locking as is well known. The screw forms the movable head and it carries an extractor specially designed to prevent misses.

Figures 7, 8, 9, 10, 11, 12:
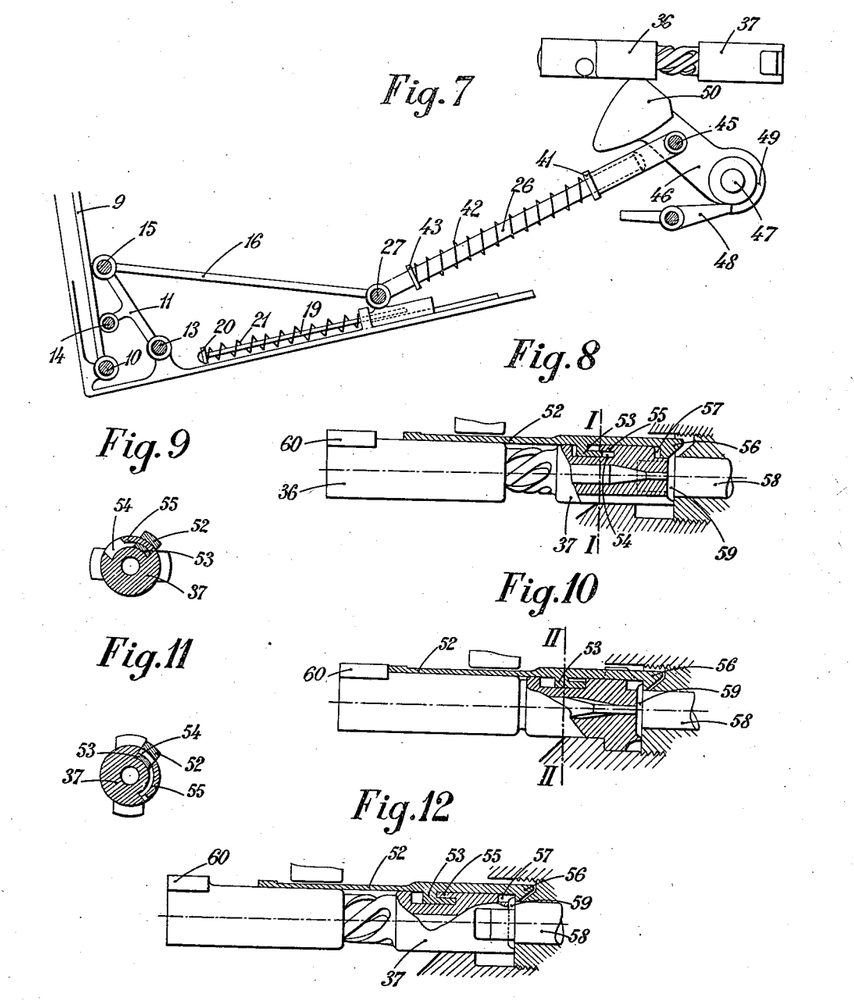
Fig. 8 is a view partly in section of the movable breech and of the head of the breech showing the working of the extractor.
Fig. 9 is a transverse section on the line 9—9 of Fig. 8.
Fig. 10 shows the position occupied by the movable breech and the head of the breech after the breech has moved into firing position.
Fig. 11 is a vertical section on the line 11—11 of Fig. 10.
Fig. 12 shows the movable breech and the head of the breech in the position which they occupy after the rearward movement and shows the working of the extractor.

This extractor is represented in Figs. 8, 9, 10, 11 and 12. In these figures 36 represents the movable breech and 37 the movable head. The extractor is shown at 52, it comprises a catch 53 adapted to enter a recess 54 made in the movable head, a lip 55 covers over this recess for a certain part of the periphery of the movable head 37. The extractor comprises also toward its right hand end, a hook 56 which is arranged in the position shown in Fig. 8 in a gap 57 in the movable head. The cartridge is shown at 58. The working of the mechanism is as follows:

In the position shown in Figs. 8 and 9, the closure of the movable head has not yet taken place, the hook 56 of the extractor meets the rim 59 of the cartridge case, but the extractor cannot rise owing to the engagement of its catch 53 with the lip 55 of the movable head.

Figs. 10 and 11 show the position occupied by the different parts above mentioned when the movable breech has advanced the amount necessary to produce the locking of the movable head; the lugs on this latter engage in the shoe of the breech by causing it to make a quarter of a revolution and the extractor is shot forward by a heel 60 carried by the movable breech striking against the tail of the extractor. At this moment, the movable head having accomplished a fraction of a revolution, the lip 55 moves out of the way, the catch 53 of the extractor is liberated and the extractor on its entirety can rise, its hook 56 riding up over the rim of the cartridge case. The rifle is ready to fire. It is pointed out that when the catch 53 is alined with the recess 54 by the partial rotation of the head, the hook 56 is free to rise so as to pass over the rim of the cartridge and to move into a position such as shown in Fig. 10. When the head and breech start the extracting movement the initial rotation of the head again locks the catch so that the hook 56 will remain in engagement with the cartridge case.

After firing the unlocking is obtained by the rearward movement of the movable breech; the position is then as shown in Fig. 12, the lip 55 covers over the catch 53, the hook of the extractor 57 consequently withdrawing the cartridge case.

All the force of the rearward movement of the movable breech therefore acts upon the catch of the extractor. This latter being of great thickness between the hook and the catch cannot bend, rise or ride over the rim of the cartridge case whatever be the resistance encountered for its extraction; furthermore this action upon the cartridge case is made at a high speed and very suddenly which facilitates loosening.

Figure 13:
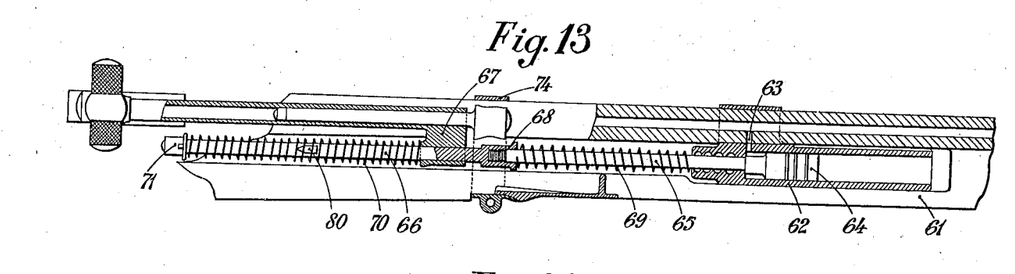
Fig. 13 shows in vertical section a constructional form of the system for operating the movable breech applicable to an ordinary rifle for the purpose of converting it into an automatic rifle.
Figure 14:
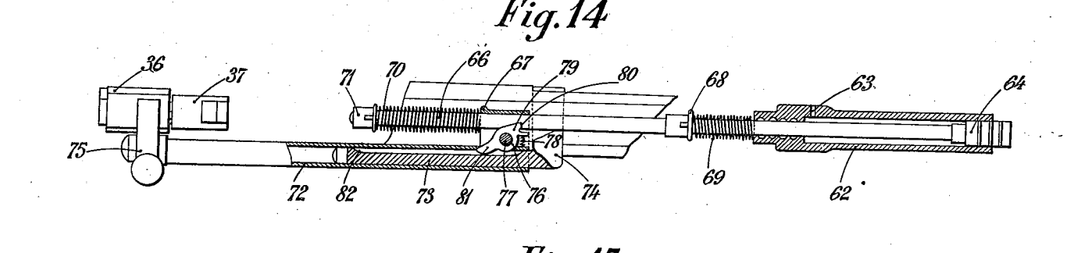
Fig. 14 is a horizontal section of the same rifle showing the extreme position of the piston after the action of the gases.
Figure 15:
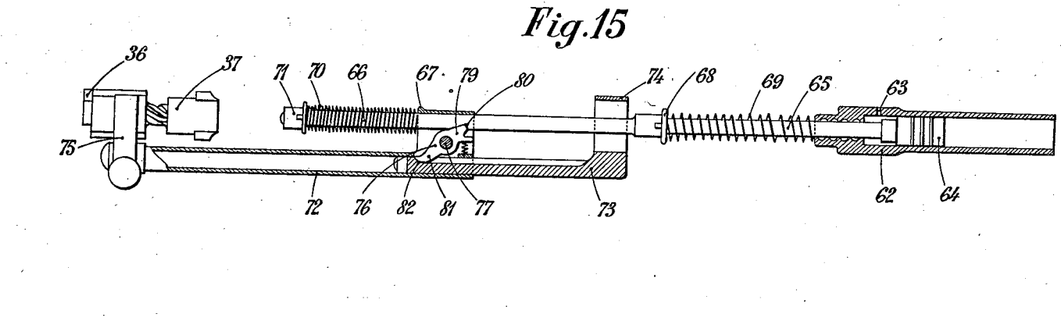
Fig. 15 shows the position occupied by the parts shown in Fig. 14, after the rearward movement has been effected and the piston has returned practically to its normal position.

Figs. 13, 14 and 15 show by way of example, the conversion of an ordinary rifle into an automatic rifle by means of a system of recuperation springs similar to that just described.

The stock 61 of the rifle is hollowed out and receives a cylinder 62 communicating by means of a vent 63 with the barrel of the rifle. A piston 64 works inside this cylinder and operates a rod 65 the end of which is screw threaded and is connected to another rod 66 passing through a bearing 67 connected to the movable breech as will be described in what follows:

The rod 66 ends in a shoulder 68, against which bears a spring 69, the other end of which bears against the lining of the cylinder 62 and the function of which is to keep the piston 64 at the bottom of its stroke toward the left. A second spring 70 bears on the one hand against the bearing 67 and on the other hand, against a shoulder on a nut 71 screwed to the end of the rod 66. The bearing 67 is rigidly attached to a socket 72 (see Fig. 14) which slides upon a guide rod 73 permanently kept on the stock by the upper band 74. The socket 72 is connected itself to the movable breech 36. The bearing 67 is made in the form of a sleeve inside which is seated a pawl 76 pivoted by an axle 77 to the bearing and constantly drawn back by a spring 78 in such a way that it tends to engage by a lug 79 in a recess 80 in the rod 66. This pawl is likewise provided with a heel 81 which comes in contact, when the pawl is toward the extreme left with respect to the guide rod 73, with a cam portion 82 of this rod which produces the unhooking of the nose of the pawl.

The working of the mechanism is as follows:

At the moment of firing the shot, the gases act through the port 63 upon the piston 64 which they drive back toward the extreme right, the springs 69 and 70 are compressed and the nose 79 of the pawl 76 enters into the recess 80 in the rod 66; we thus have the position of Fig. 14.

As soon as the pressure of the gases in the cylinder 62 diminishes, the action of the spring 69 produces the movement of the rods 65 and 66 and by means of the pawl 76 of the bearing 67, the socket 72 and the collar 75, the movement of the movable cylinder thus bringing about the unlocking of the breech, the extraction of the cartridge case and the cocking of the firing mechanism. The heel 81 of the pawl comes, when the movable cylinder is at the end of its stroke, in contact with the cam portion 82 of the guide rod 73, the pawl rocks upon its pivot so as to unhook the rod 66, the spring 70 expands, but as the rod 66 and the nut 71 remain fixed it carries with it the bearing 67, the socket 72 and by means of the collar 75, the movable breech, thus producing the closing of the movable head and the introduction of a fresh cartridge.

The conversion comprises therefore:

1—The replacement of the movable breech entirely by another movable breech having a movable screw head, a cylindrical nut provided with a dismountable firing pin.

2—The replacement of the trigger and the sear by another system of trigger and a trip sear.

3—The addition of a protective liner at the rear of the shoe of the breech.

4—The modification of the present upper band consisting in connecting a guide rod to the left hand side.

5—The addition of the mechanism worked by gas in the stock.

Figure 16:
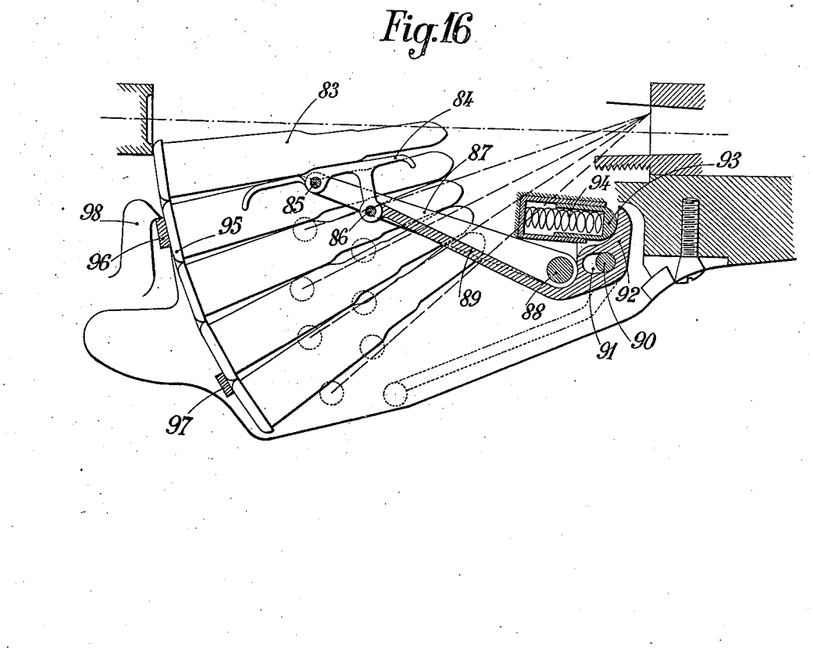
Fig. 16 shows in a vertical section a modification of the elevator mechanism.
Figure 17:
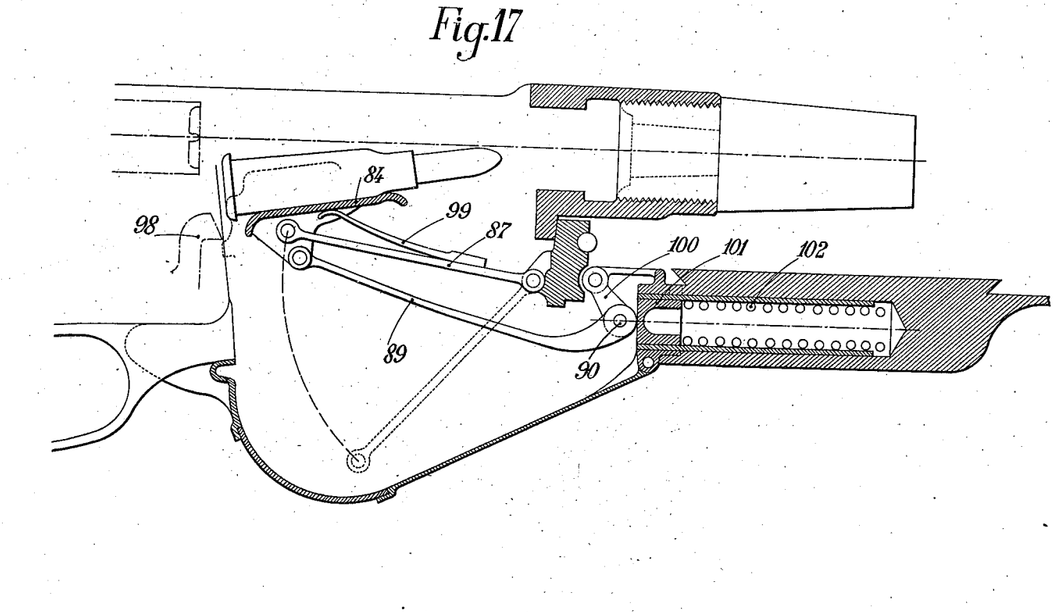
Fig. 17 is a vertical section of another modification.

According to the modifications shown in Figs. 16 and 17 the cartridges are elevated in such a way that the axis of each successive cartridge will gradually aline with the axis of the breech as said cartridges reach the breech. The mechanism comprises an upper plate provided with two joints or pivots one of which is connected to a fixed point, by means of a small connecting rod, the other pivot, placed lower down, being connected to an axle by means of an elevator, and capable of slight lateral movements either as the result of a recess or slot of ovoid or other particular shape of the notch which serves as the pivot point, or by its connection with a lever. The elevator serves at the same time as a motor element of the system, owing to the action of a spring bearing against the magazine trigger guard and constantly forcing it back in a fixed direction.

Referring to Fig. 16 of the drawing it is supposed that the modified elevator is represented at the moment when the last cartridge denoted by 83 is left in the rifle. This cartridge is supported by the plate 84 pivoted to the axles 85 and 86. The axle 85 is connected by a rod 87 and an axle 88 to the magazine trigger guard so that the axle 85 can describe a circular path. The axle 86 is connected to the elevator 89 which serves as a motor element of the system, an axle 90 belonging to the magazine trigger guard being adapted to slide in an ovoid notch 91 in the elevator, so as to permit of slight lateral movements thus assuring convergence of the different positions occupied by the upper plate 84. The elevator 89 is provided with a lug or nose 92 which bears on a head 93 against the action of a helical spring 94 bearing against the magazine trigger guard. The magazine or loader 95 containing the cartridges is of known form, and is provided with symmetrical projections 96 and 97 permitting the hook 98 to hold it in place or release it at will.

Fig. 17 represents a modification of the mechanism hereinbefore described in which the connecting rod 87 is provided with a spring 99 tending to force back constantly the upper plate 84 into the position which the elevator allows it to take up. The ovoid notch of this elevator is done away with, the pin 90 being pivoted by means of a link 100 to the magazine trigger guard and it bears against a piston 101 constantly forced back by a spring 102 placed in the stock of the rifle. As in the preceding construction the pin 90 may move laterally in the guiding path referred to as notch 91.

I claim:

1. In an automatic fire arm, a movable breech, a firing hammer, a slide, spring connections between the slide and the movable breech and between the slide and firing hammer, a cushioning return spring for the slide, means operable by the gases of discharge to compress the springs, and means whereby the breech and hammer will be retracted upon the subsequent expansion of said return spring.

2. In an automatic firearm, a movable breech, a firing hammer, a slide, spring connections between the slide and the movable breech and between the slide and firing hammer, a cushioning return spring for the slide, means operable by the gases of discharge to compress the springs, means whereby the breech and hammer will be retracted upon the subsequent expansion of the return spring, and means for automatically releasing said second mentioned means, whereby one of said springs will project said breech forwardly.

3. In an automatic firearm, a movable breech, a firing hammer, a slide, telescopic rods connecting the slide with the hammer and with the movable breech, and resilient means for extending the elements of said telescopic rods for returning said breech and projecting said hammer.

4. In an automatic firearm, a movable breech, a firing hammer, a lever connected to the breech, telescopic rods connected to the lever and to the hammer, a slide to which said rods are pivoted, springs tending, when under compression, to operate the lever and hammer, said springs being placed under compression by the movement of the slide, means connected to the slide for moving the same under the action of the discharge of the gases, and means for opposing such movement of the slide.

5. In an automatic firearm, a movable breech, a firing hammer, a slide, spring connections between the slide and the movable breech and between the slide and the firing hammer, a cushioning return spring for the hammer, a cushioning return spring for the slide, means operable by the gases of discharge to compress all of said springs, means for locking said breech spring in its compressed position, whereby the breech will be retracted upon the subsequent expansion of said return spring, said breech adapted to simultaneously engage and retract the firing hammer and compress the firing hammer spring, and means for locking said hammer in its retracted position.

In testimony whereof I affix my signature, in presence of two witnesses.

EMILE ALEXANDRE LOUIS BOURDELLES.

Witnesses:
   CHAS. P. PRESSLY,
   ALEXANDRE BERTHOLF.